July 31, 1962 B. VER NOOY 3,047,266
VALVE
Filed Dec. 18, 1957 3 Sheets-Sheet 1

INVENTOR
BURTON VER NOOY

July 31, 1962 B. VER NOOY 3,047,266
VALVE
Filed Dec. 18, 1957 3 Sheets-Sheet 3

INVENTOR
BURTON VER NOOY
ATTORNEYS

United States Patent Office 3,047,266
Patented July 31, 1962

3,047,266
VALVE
Burton Ver Nooy, Tulsa, Okla., assignor to
T. D. Williamson, Inc., Tulsa, Okla.
Filed Dec. 18, 1957, Ser. No. 703,678
4 Claims. (Cl. 251—175)

This invention relates to a valve having an improved arrangement for sealing between the valve member and body. In one of its more specific aspects, it relates to a "sandwich" type valve having such sealing arrangement as permits economical construction and yet positive, leak-proof seating of the valve member.

In the development in a simple gate valve, it was proposed that the conventional metal-to-metal seat between the gate and valve body be substituted by a O-ring type seal. Such a substitution would allow greater tolerances between the gate and valve body and hence reduce manufacturing cost. Also, it would eliminate tapering seating surfaces of the metal-to-metal type which are conventional in a gate valve and permit the use of flat parallel seating surfaces which would also reduce manufacturing cost. However, when such an arrangement was tested, there was presented a problem of retaining the O-ring in its groove as the gate moved between seated and unseated positions. Further it was found that when pressure was applied against the gate in closed position, the increased tolerances mentioned above permitted it to move laterally so that leakage developed across the O-ring sealing between the upstream side of the gate and the valve body.

It is toward the solution of these problems that this invention is directed and accordingly, it is an object to provide a valve wherein an O-ring type seal acting between the valve member and body is positively maintained in its groove and yet functions properly despite movement of the valve member laterally in a direction such as would normally cause the O-ring to lose its sealing contact with the surface against which it seals.

Another object is to provide a valve in which an O-ring sealing element is mechanically retained in its groove during movement of the valve member from open to closed position.

Another object is to provide a gate valve of very simple yet rugged construction and one affording relatively large manufacturing tolerances between the gate and seat but yet which provides a positive seal therebetween.

Another object is to provide a valve having a fluid pressure energized seal on opposite sides of its valve member, the seals both being simultaneously effective to seal against flow from either direction through the valve despite lateral movement of the valve member by the pressure of fluid sealed against such as would tend to render one of the seals ineffective.

Another object is to provide a valve in which liquid cannot be trapped between the valve disc and body when the disc is in open position despite the fact the disc carries pressure energized seals on its side faces which tend to seal with the body when the disc is in open position. The trapping of such liquid in the enclosed space within the seal would permit extremely high pressures to develop due to heating and expansion of the liquid as by exposing the valve to the hot summer sun. The high pressure could warp the valve body or do other damage besides making it difficult to close the valve.

Other objects, advantages and features of the invention will be apparent to one skilled in the art upon a consideration of the specification, claims and drawings wherein:

Figure 1:
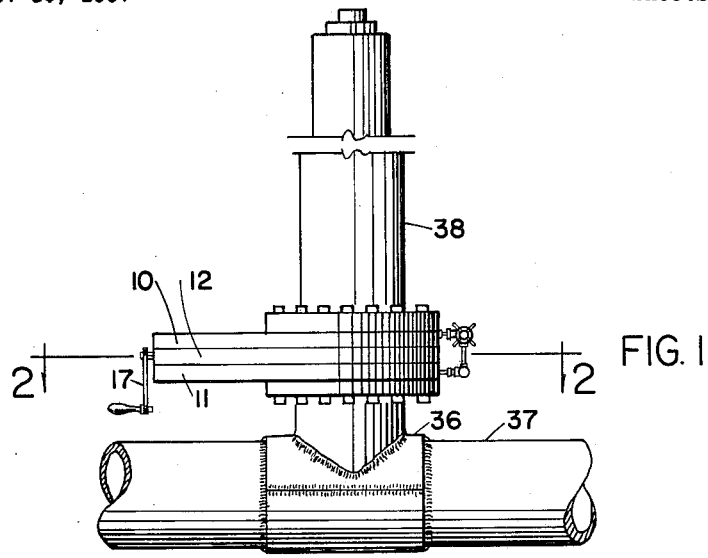
FIG. 1 is an elevational view of a pipeline showing a preferred embodiment of the valve of this invention mounted thereon.
Figure 2:
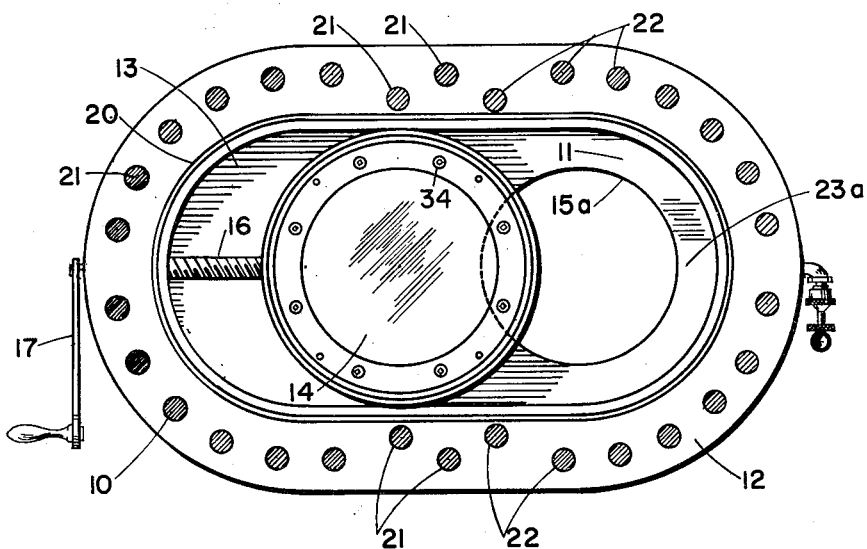
FIG. 2 is a sectional view taken on line 2—2 of FIG. 1 and showing the interior of the valve.

Referring now to FIGS. 1 and 2, the valve has a body which in a preferred form comprises upper and lower plates 10 and 11 which can be substantially flat and parallel. Sandwiched between the plates is a spacer ring or flange 12 which has its interior cut away to provide a space 13 in which valve member or disc 14 is disposed. Plates 10 and 11 are provided with registering ports 15 and 15a adjacent one of their ends and the valve disc is of such size that when it is in seated position (to the right in FIG. 2), it is disposed across these ports to prevent flow therebetween. The disc is moved between seated and unseated positions by any suitable means. Such means is here illustrated as including a valve stem 16 extending into an opening in disc 14 and threaded to the disc. The valve stem has a sealed connection with flange 12 permitting the stem to rotate without leakage but not to move longitudinally. Thus, upon turning handle 17, the valve disc travels along the stem into and out of register with ports 15 and 15a.

Plates 10 and 11 and flange 12 are sealed together as by O-rings 20 disposed on opposite sides of the flange. The plates and flange are held together at one end by a plurality of studs 21. The ported end of the valve can be provided with longer studs 22 which extend for connection with flanges of equipment to be connected to valve. Of course, a full circuit of studs can be provided for this connection as illustrated in FIG. 1.

Valve disc 14, when in seated position, can have considerable clearance with seats 23 and 23a on plates 10 and 11. This clearance can be in the order of several thousandths of an inch, e.g. 3 to 20 thousandths on a side. The clearance results from the maintenance of relatively low manufacturing tolerances on the thickness of the valve disc relative to the thickness of flange 12 and vice versa. However, as result of such clearances, it will be seen that when fluid pressure is applied through one of ports 15 or 15a with the valve disc in seated position, the pressure will tend to push the disc laterally away from one of seats 23 or 23a toward the other seat. This movement somewhat complicates the problem of providing an adequate seal between the valve disc and the plates while the disc is in seated position but the seal means described below has been found to adequately overcome such problem.

Before turning to the description of the sealing means, it should be pointed out that the surfaces 23 and 23a on plates 10 and 11 and surrounding ports 15 are herein termed "seats." This terminology will be applied even in the case where the seal means is disposed on surface 23 rather than on the valve disc as shown and the invention contemplates such arrangement as being within its scope.

Figure 3:
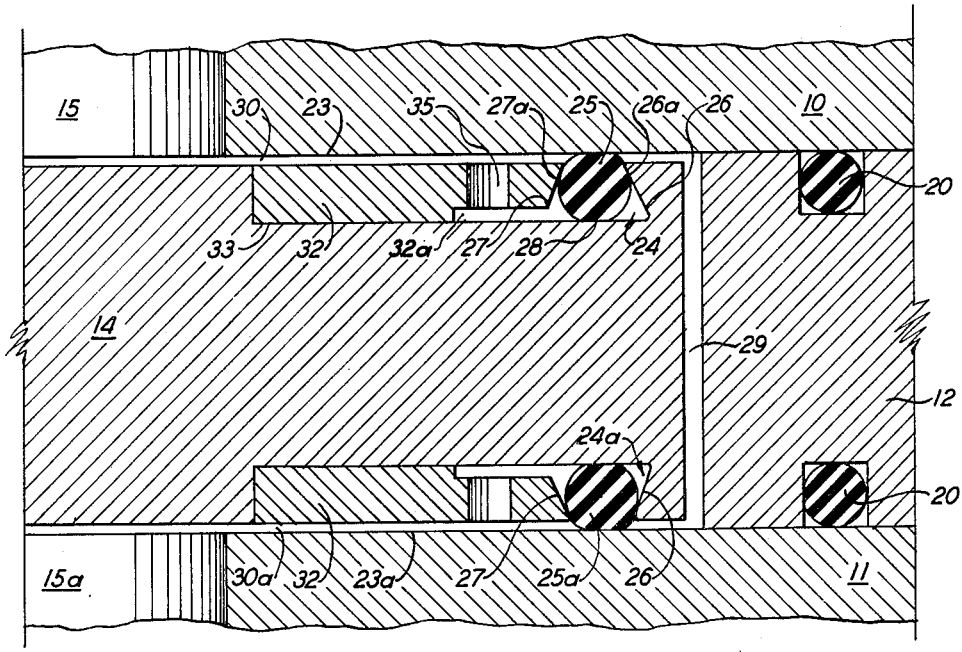
FIG. 3 is an enlarged view of part of the valve disc and surrounding body showing the disc and seal arrangement before pressure is applied to the valve.
Figure 4:
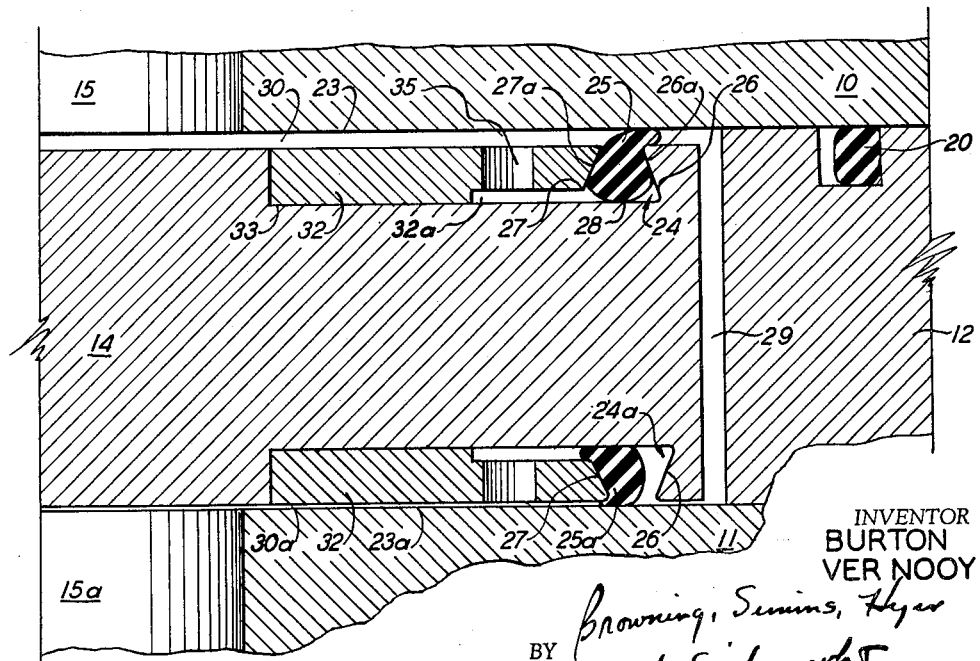
FIG. 4 is a view similar to FIG. 3 but showing the disposition of the disc and seals when pressure is applied to one side of the disc.

The preferred arrangement of the seal means of this invention is perhaps best illustrated in FIGS. 3 and 4. Thus, the valve disc is provided with an annular groove 24 and 24a respectively in its faces which grooves surround ports 15 and 15a when the disc is in seated position.

Disposed in these grooves are O-ring type seals 25 and 25a.

In order to mechanically maintain these seals in position as the valve disc is being moved between open and closed positions, the side walls 26 and 27 of the grooves converge towards the mouths of the grooves. Here the side walls are shown sloping so that the appearance of the grooves in cross-section is dovetailed. The slope of the walls 26 and 27 should be sufficient, relative to the size of the O-ring, that the walls touch the O-ring, as at points 26a and 27a, to urge the O-ring toward the bottom of the groove as at 28. Thus, the O-ring is engaged by the disc at points 26a, 27a and 28. This engagement preferably is sufficient that the O-ring forms an initial sealing contact at these three points and the portion of it protruding beyond the mouth of the groove is somewhat distorted from its normal arcuate cross-sectional shape. The depth of the groove and the diameter of the O-ring are proportioned relatively to each other to achieve the above arrangement and also such that the O-ring protrudes sufficiently from the mouth of the groove such that when the disc is in seated position, the protruding portion forms an initial sealing engagement with seats 23 as indicated in FIG. 3. This proportioning of the O-ring and groove will also have to take into account the expected maximum clearance between the disc and the plates.

With this sealing arrangement, it was found that the O-rings were satisfactorily maintained in place while the disc was moved between seated and unseated positions. It was also found that when pressure was exerted in space 29 and ports 15 and 15a were each vented, the O-rings formed a satisfactory seal. However, it was found that when pressure was applied through one of ports 15 or 15a and the other port vented, the O-rings adjacent the pressurized port frequently leaked. Thus when pressure was applied to the port 15 as shown in FIG. 4, valve disc 14 tended to move downwardly toward plate 11 so that clearance 30a was greatly reduced and essentially non-existent. Such movement essentially doubled clearance 30 resulting in a movement of O-ring 25 away from plate 10 and seat 23. As a result, the initial seal between O-ring 15 and the seat 23 tended to be lessened or even completely interrupted permitting the O-ring to leak.

In order to overcome this problem, the grooves were placed in fluid communication respectively with ports 15 and 15a, the portion of the groove in such communication being that inwardly of points 26a and 27a. As a result, the pressure to be sealed against in one of the body ports was applied under the O-ring causing it to tend to move from its groove toward seat 23 and thus maintain its initial sealing contact with this seat. Then as the pressure increased, O-ring 25 was distorted into the shape A as shown in FIG. 4 to maintain the seal between the disc and seat 23.

In the event O-ring 25 fails, the pressure fluid sealed against will pressurize space 29 and O-ring 25a will provide an effective "back-up" or secondary seal. Since clearance 30a will remain small or essentially non-existent, the O-ring will have no difficulty in sealing between the disc and plate 11. However, O-ring 25a must also seal passageway 33, to be described below and this it effectively done by assuming the shape shown in FIG. 4. Thus this O-ring has a double sealing function.

In order to facilitate placement of the O-ring in the dovetail groove and also to easily provide for pressure fluid to flow from one of body ports into the groove, a removable ring 32 can be employed. This ring fits into a slot 33 machined in the face of the disc and is held in place by suitable means such as screws 34. It will be noted that one peripheral wall of the ring carries side wall 27 of the groove. Also, the ring has an annular undercut portion as at 32a, extending radially inwardly toward the center of the disc from the bottom of the groove. Also, ports 35 are provided through the ring groove so that pressure fluid from the body ports can flow to the interior of the groove. Thus, the undercut portion 32a and ports 35 provide means for placing the groove inwardly of points 26a and 27a, in fluid communication with the valve body passage upstream, respectively, of the sides of the disc.

With the foregoing arrangement, it has been found that a satisfactory seal will be perfected irrespective of whether pressure is applied from one side of the valve disc or the other. Also, if one seal fails or leaks, the second seal prevents leakage and its action is very efficient due to the valve member having moved toward the seat against which the remaining effective O-ring engages thereby leaving very little clearance between the disc and body plate through which the O-ring can be extruded by high pressures.

It will be noted that the illustrated design thus not only provides dual seals one of which "back-up" the other in case of the latter's failure or leakage, but also that the entire valve can be placed in operating position without reference as to whether it has an upstream or downstream side. Thus, the valve can be mounted, for example, upon a T 36 connected to pipeline 37. On top of the valve can be situated any desired mechanism such as a plugging device 38 here illustrated very schematically but intended to move a plug downwardly through the open valve and into the pipeline to plug the same. Since the valve is symmetrical both in design and function, it will be immaterial whether the valve is mounted with plate 10 on top or on the bottom and it will be effective to seal against the pipeline pressure irrespective of whether it is mounted as shown in FIG. 1 or in a turned over position.

When the valve is in full open position and in use on a pipeline, for example, it will be seen that liquid will be trapped in the clearances 30 and 30a between the valve disc and the upper and lower plates and within the O-rings 25 and 25a. When the valve is exposed to heat, as it will be in use in the summer on pipelines, the temperature of the liquid rises with resultant expansion and exertion of tremendous forces on the upper and lower valve plates. This liquid cannot escape because the more its pressure increases, the tighter becomes the seal of the O-rings with the plates. As a result, buckling of the plates, excessive stresses on the studs 22, and even excess extrusion of the O-rings can result. Moreover, movement of the valve disc becomes difficult due to the increased function of the O-rings.

Figure 5:
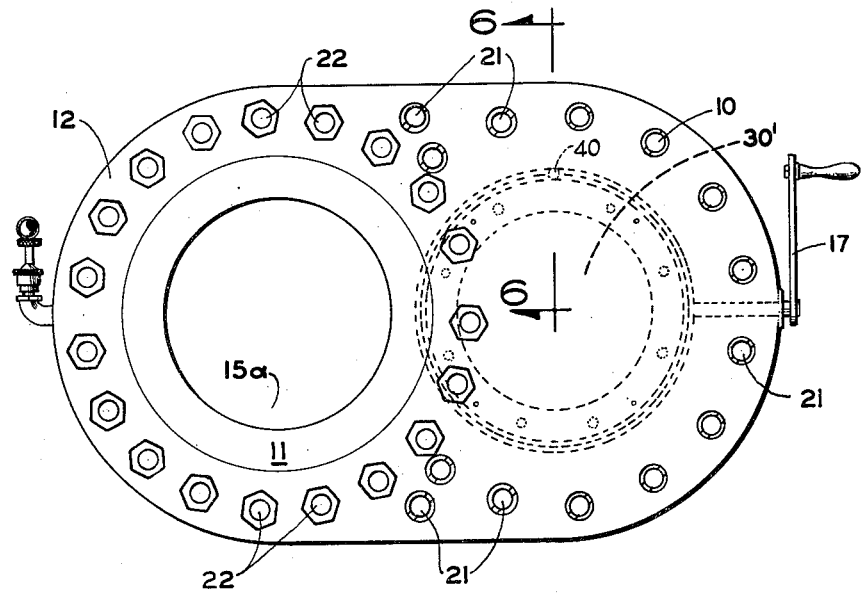
FIG. 5 is a plan view of the valve showing the disc in full open position and illustrating the stud arrangement.
Figure 6:
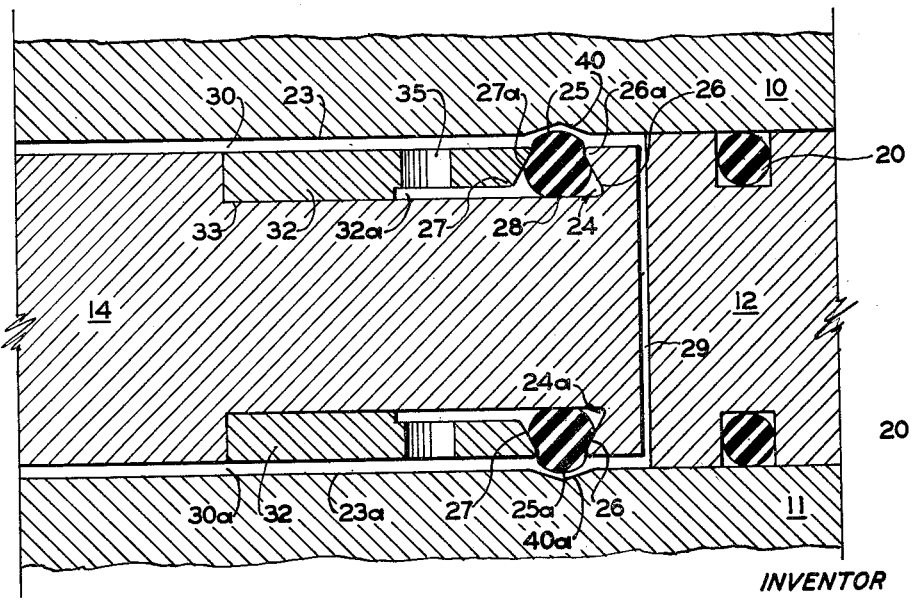
FIG. 6 is a view on the line 6—6 of FIG. 5 showing a preferred means for preventing the trapping of fluid between the disc and valve body.

To prevent the above described excessive pressure from developing, means are provided for by-passing the O-rings or pressure energized seals when the valve disc is in open position. Referring now to FIGS. 5 and 6, the disc is shown in its full open position in FIG. 5, and it will be seen that liquid will be trapped in the general area labeled 30'. The by-pass arrangement is shown in FIG. 6 as comprising cut-away portions 40 and 40a respectively in plates 10 and 11. These cut-away portions extend across O-rings and provide a fluid passageway thereacross. As a result, liquid trapped in clearance 30 within the O-rings can flow outwardly therefrom to equalize pressure across the O-rings.

The by-passes can be provided in a number of different ways such as by slotting, grooving, etc. the plates, but a preferred way is to simply dimple the disc as shown. This can be done by partially drilling into the surfaces of the plate until the depth of the hole is sufficient to assure the O-ring cannot form a seal with the surface at the bottom of the hole or dimple. Then when the valve disc is in full open position, liquid pressure will be equalized at all times across the O-rings.

It is preferred that the by-pass be situated on a diameter of the disc lying at right angles to its longitudinal axis of movement. By so locating the bypass, greater latitude is given in positioning the valve disc in full open position and yet the by-pass will be effective even though small. This is true because in this position of the by-pass the length of the O-ring extends in the direction of its movement so that the valve disc's position is not critical in establishing the by-pass.

While the seal arrangement of this invention has been described with specific reference to a "sandwich" valve, it is also applicable to other types of valves having a substantially flat surface in which an O-ring type seal is to be maintained. Further, while it is preferred that the valve disc be flat, i.e. have parallel faces, such is not essential.

From the foregoing it will be seen that this invention is one well adapted to attain all of the ends and objects hereinabove set forth, together with other advantages which are obvious and which are inherent to the apparatus and method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A high pressure valve for liquid comprising two plates having substantially flat parallel inner faces opposing each other; a closure ring disposed therebetween providing a space between the plates; ports in each plate opposite to each other, said ports cooperating with each other and with said space to form a flow passage through the valve; a substantially flat valve closure disc movable in said space from a seated position across said ports to an unseated position laterally of the ports, said valve disc being loosely fitting within said space with sufficient clearance between the opposing faces of said disc and plates to provide high tolerance in manufacture of said disc and plates; a pair of annular grooves, each respectively disposed on opposite sides of said closure disc to surround the passage when the disc is across said ports, each of said grooves having side walls converging toward its mouth facing an adjacent seat; an O-ring seal in each of said grooves, said grooves and O-rings having proportions such that each O-ring is pressed against both side walls and bottom of its groove and is distorted to protrude from the mouth of its groove into initial sealing contact with its adjacent seat when the disc is in seated position and also into initial sealing contact with an adjacent face of said plates when the disc is in unseated position, the faces of said disc, when the disc is in unseated position, being spaced due to the aforementioned clearance from the respective opposing faces of the plates to define chambers bounded by said seals in which chambers liquid tends to be trapped as the disc is moved to its unseated position; and a bypass passage across the seals when the disc is in unseated position permitting substantial relief of pressure across the seals.

2. The valve of claim 1 wherein the bypass passage comprises dimples in the face of said plates of sufficient depth that the seals cannot make contact with the bottom surfaces of the dimples.

3. The valve of claim 1 wherein the bypasses are located on a diameter of the disc extending at right angles to the axis of the disc's movement between seated and unseated positions.

4. The valve of claim 1 wherein the by-pass passage is situated in the plates on a diameter of the disc extending at right angles to the axis of the disc's movement between seated and unseated positions.

References Cited in the file of this patent

UNITED STATES PATENTS

| | | |
|---|---|---|
| 1,872,417 | Dalldorf | Aug. 16, 1932 |
| 2,490,511 | Courtot | Dec. 6, 1949 |
| 2,531,679 | Glos | Nov. 28, 1950 |
| 2,542,390 | Brown | Feb. 20, 1951 |
| 2,547,116 | Gould | Apr. 3, 1951 |
| 2,547,831 | Mueller | Apr. 3, 1951 |
| 2,604,293 | Phillips | July 22, 1952 |
| 2,621,885 | Schmitt | Dec. 16, 1952 |
| 2,669,416 | Hilton | Feb. 16, 1954 |
| 2,674,436 | Jones | Apr. 6, 1954 |
| 2,675,024 | Clark | Apr. 13, 1954 |
| 2,676,782 | Bostock | Apr. 27, 1954 |
| 2,688,975 | Born | Sept. 14, 1954 |
| 2,709,455 | Greenwood | May 31, 1955 |
| 2,747,611 | Hewitt | May 29, 1956 |
| 2,810,542 | Bryant | Oct. 22, 1957 |
| 2,810,543 | Bryant | Oct. 22, 1957 |
| 2,870,987 | Greenwood | Jan. 27, 1959 |
| 2,889,134 | Bryant | June 2, 1959 |
| 2,950,897 | Bryant | Aug. 30, 1960 |

FOREIGN PATENTS

| | | |
|---|---|---|
| 155,828 | Australia | Mar. 24, 1954 |
| 1,101,193 | France | Apr. 20, 1955 |